United States Patent [19]

Herbulot et al.

[11] Patent Number: 4,469,203

[45] Date of Patent: Sep. 4, 1984

[54] ROTATABLE BRAKE MEMBER PROVIDED WITH VENTILATION CHANNELS

[75] Inventors: Jean Herbulot, Franconville; Bernard Jumel, Pierrefitte, both of France

[73] Assignee: Valeo, Paris, France

[21] Appl. No.: 340,692

[22] Filed: Jan. 19, 1982

[30] Foreign Application Priority Data

Jan. 27, 1981 [FR] France .................. 81 01453

[51] Int. Cl.³ .................. F16D 65/12; F16D 65/847
[52] U.S. Cl. .................. 188/218 XL; 188/264 A; 192/107 R; 192/113 A
[58] Field of Search ........ 188/218 A, 218 XL, 264 A, 188/264 AA, 71.6; 192/107 R, 113 A

[56] References Cited

U.S. PATENT DOCUMENTS

| | | | |
|---|---|---|---|
| 2,255,024 | 9/1941 | Eksergian | 188/218 XL |
| 2,345,017 | 3/1944 | Tack | 188/264 A |
| 2,368,621 | 2/1945 | Tack | 188/264 A |
| 2,769,512 | 11/1956 | Tack | 188/218 XL |
| 2,775,322 | 12/1956 | Bachman | 188/218 XL |
| 3,732,953 | 5/1973 | Huet | 188/264 AA X |
| 3,892,297 | 7/1975 | Brownyer | 188/218 XL |
| 4,164,993 | 8/1979 | Kobelt | 188/218 XL |

FOREIGN PATENT DOCUMENTS

| | | |
|---|---|---|
| 1164761 | 3/1964 | Fed. Rep. of Germany . |
| 1176694 | 8/1964 | Fed. Rep. of Germany . |
| 2458048 | 6/1976 | Fed. Rep. of Germany . |
| 1206671 | 2/1959 | France . |
| 1266395 | 9/1960 | France . |
| 2428184 | 1/1980 | France . |
| 2076090 | 11/1981 | United Kingdom ........ 188/264 AA |

Primary Examiner—George E. A. Halvosa
Attorney, Agent, or Firm—Young & Thompson

[57] ABSTRACT

A rotatable brake member comprises a plurality of substantially radial ventilation channels, each of which is divided longitudinally into at least two portions which are generally coaxial with a mean longitudinal line of the channel and which have substantially constant cross-sections, these portions having an abrupt discontinuity of cross-section relative to one another, the or each channel defining a single, empty radial passage, the side wall of the or each of these portions being smooth and continuous, and the abrupt discontinuity of cross-section between the portions being provided by a peripheral transverse annular step.

4 Claims, 12 Drawing Figures

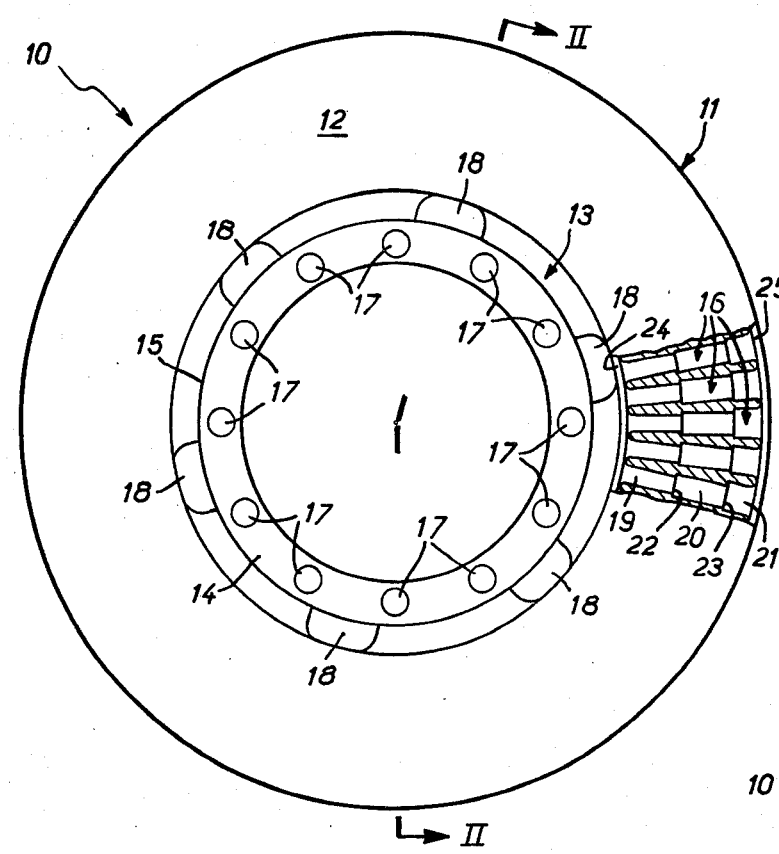
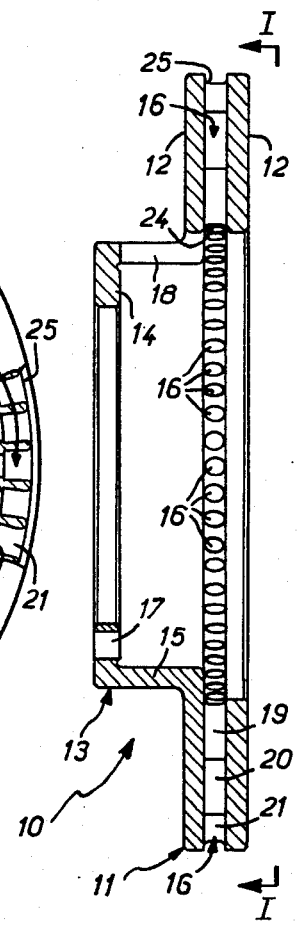
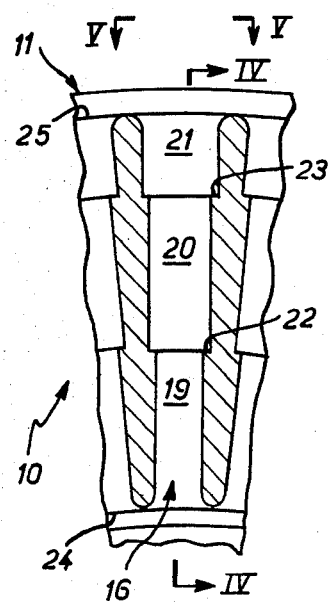
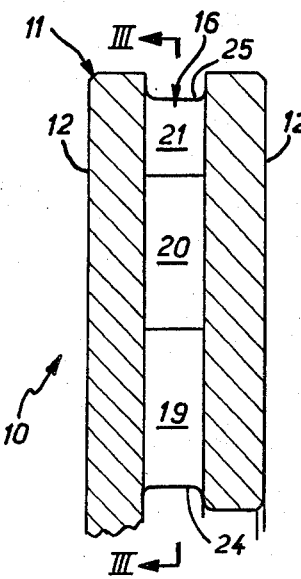
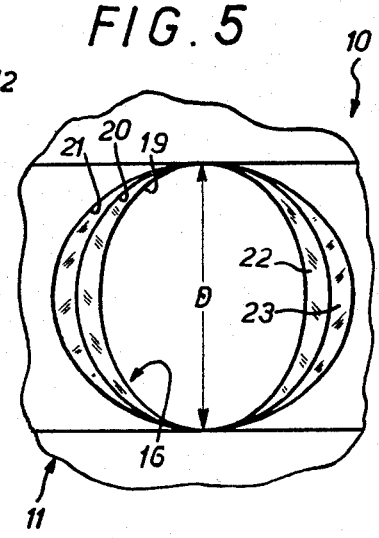

4,469,203

ROTATABLE BRAKE MEMBER PROVIDED WITH VENTILATION CHANNELS

BACKGROUND OF THE INVENTION

The present invention relates to a rotatable brake member comprising a plurality of ventilation channels. In particular, such a member may comprise a brake disc.

In general, in known brake discs, each ventilation channel is delineated by a continuous inner wall. This form doubtlessly allows good aerodynamic conditions for the flow of ventilation air. However, the cooling obtained is often not completely satisfactory.

It is an object of the present invention to provide a rotatable brake member comprising a plurality of ventilation channels, and which enjoys excellent cooling conditions.

SUMMARY OF THE INVENTION

According to the invention, this brake member is characterised in that, as regards at least some of the ventilation channels, the channel is divided longitudinally into at least two portions separated by a step causing an abrupt discontinuity of cross-section.

With such an arrangement, the aerodynamic conditions of flow of the air in the channels are doubtlessly less satisfactory than in the case where the inner wall delimiting the channel is continuous, but the effect of the turbulence generated by the presence of the at least one step is to promote heat exchange between the ventilation air and the rotating member. The result of this is, therefore, a poorer flow, but, as has been noted, paradoxically better cooling, this being the main purpose of the channels.

The step can have any suitable shape and is preferably substantially perpendicular to the mean longitudinal line of the channel. However, it can also be inclined relative to this line.

The abrupt discontinuity of cross-section can be provided by varying the area of the cross-section with aligned or offset axes of the portions and with similar or dissimilar contours of the portions, but it is also possible to have portions, the cross-sections of which have equal areas, but the contours of which are offset, either because they are different or because their axes are offset, or for both of these reasons.

It should be noted that each channel can be either divergent or convergent or partly divergent and partly convergent or of a cross-section of constant area. It is advantageously disposed substantially radially.

In the case where the portions have cross-sections of different areas, the variation in the area is advantageously between 10% and 30% and is preferably in the neighbourhood of 20%. In this way, good turbulence is obtained, whilst the channel is provided with a sufficiently large inlet to permit a substantial flow and with a sufficiently small outlet which does not risk lowering the strength of the rotating member.

According to another characteristic, each portion of the channel has a constant cross-section, for example circular, elliptical or polygonal.

In one embodiment of the invention, the channel has three portions separated respectively by two steps.

In this case, according to a non-limiting embodiment, the intermediate portion has a circular cross-section, whilst each of the end portions has an elliptical cross-section. Preferably, one of the end portions of elliptical cross-section has a major axis of the ellipse equal to the diameter of the intermediate portion of circular cross-section which is itself equal to the minor axis of the ellipse of the other end portion of elliptical cross-section.

With a disc provided with such channels, excellent cooling conditions are obtained. Moreover, the construction of the rotating member is relatively simple and it is convenient to produce.

BRIEF DESCRIPTION OF THE DRAWINGS

FIG. 1 is a view of a rotatable brake member, comprising a brake disc, according to the invention, in an elevation in the direction of the arrows I—I of FIG. 2, with a partial cutaway;

FIG. 2 is a view of this disc, in cross-section along the broken line II—II of FIG. 1;

FIG. 3 is a view of one of the ventilation channels, on a larger scale, in a cross-section along the line III—III of FIG. 4;

FIG. 4 is a corresponding view of this channel, in a cross-section along the line IV—IV of FIG. 3;

FIG. 5 is an end view of this channel, on an even larger scale, in the direction of the arrows V—V of FIG. 3;

DESCRIPTION OF THE PREFERRED EMBODIMENTS

Figure 6:
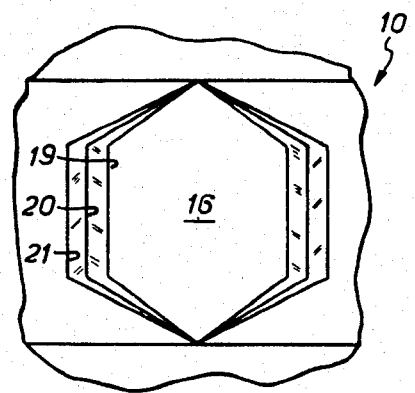
FIG. 6 is a view similar to FIG. 5, but relating to an alternative form.

Referring first of all to FIGS. 1 to 5, these relate, by way of non-limiting example, to an application of the invention to a brake disc for a motor vehicle and they show this disc denoted generally by 10.

The disc 10 possesses a peripheral part 11 having two opposite annular friction tracks 12 substantially perpendicular to the axis. The disc 10 also possesses a central fixing part 13 having an annular fixing flange 14 connected by a cylindrical ring 15 to the peripheral part 11.

The peripheral part 11 possesses a plurality of radial ventilation channels 16. The flange 14 has a series of holes 17 for fixing to a wheel of the vehicle. Moreover, the cylindrical ring 15 possesses a series of orifices 18.

Each radial channel 16 made in the peripheral part 11 of the disc 10 diverges from the inside outwards and, in the example illustrated in FIGS. 1 to 5, is divided longitudinally into three portions: an inner end portion 19, a central portion 20 and an outer end portion 21 (FIGS. 3 to 5). The portions 19 and 20 are separated by a step 22 causing an abrupt discontinuity of cross-section, whilst the portions 20 and 21 are separated by a step 23 also causing an abrupt discontinuity of cross-section.

The abrupt discontinuity of cross-section at 22 or at 23 is provided by varying the area of the cross-section of the portions. This variation is advantageously between 10% and 30% and is preferably in the neighbourhood of 20%. In this way, the inlet 24 of the channel 16 has a sufficiently large cross-section to allow a substantial flow, whilst the outlet 25 of the channel 16 is sufficiently small not to risk compromising the strength of the peripheral part 11 of the disc 10.

Each part 19, 20 and 21 of the channel 16 has a constant cross-section and is coaxial with the mean longitudinal line of the channel 16, each of which longitudinal lines, as is evident from FIGS. 1 and 3, comprises a radius of disc 10. Each step 22 or 23 is substantially perpendicular to the axis of the channel 16.

More particularly, the intermediate portion 20 of the channel 16 has a circular cross-section, whilst each of the end portions 19 and 21 of the channel 16 has an elliptical cross-section. The inner end portion of elliptical cross-section 19 has a major axis of the ellipse (FIG. 5) equal to the diameter D of the intermediate portion of circular cross-section 20, which is itself equal to the minor axis of the ellipse of the outer end portion of elliptical cross-section 21.

As may be seen more especially in FIGS. 3 to 5, the steps 22 and 23 have a bi-lunular form (FIG. 5).

By means of the arrangement according to the invention, the steps 22 and 23 cause turbulence in the flow of air which passes through the channels 16, thus promoting the heat exchanges between the ventilation air and the peripheral part 11 of the disc 10. Excellent cooling of the disc 10 is obtained in this way.

In an alternative form (FIG. 6), the arrangement is similar to that which has just been described with reference to FIGS. 1 to 5, but the portions 19, 20 and 21 of the channels 16, instead of having a circular or elliptical cross-section, have a polygonal cross-section, for example hexagonal, as illustrated in FIG. 6, but this could instead be square or another shape.

In the example illustrated in FIGS. 1 to 5, the step 22 or 23 is substantially perpendicular to the axis of the channel 16. However, it is also possible to envisage inclining the steps 22 and/or 23 in relation to this axis, as illustrated in FIG. 7.

Figure 7:
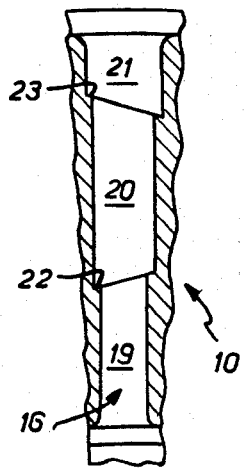
FIGS. 7, 8, 9, 10, 11 and 12 are views similar to FIG. 3, but relate respectively to six other alternative forms.
Figure 8:
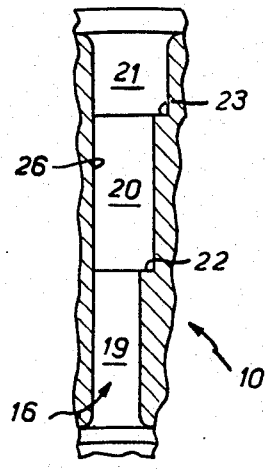

In the examples of FIGS. 1 to 5, of FIG. 6 and of FIG. 7, the portions 19, 20 and 21 are coaxial along the mean longitudinal line of the channel 16. However, it is also possible (FIG. 8) to envisage the portions 19, 20 and 21 with their axes spaced and parallel. These portions 19, 20 and 21 are advantageously cotangent along a generating line 26, as illustrated in FIG. 8. In this case, the steps 22 and 23 are located on one and the same side of the channel 16.

Figure 9:
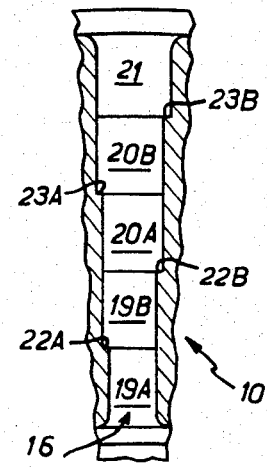

With such a cotangent arrangement, it is also possible to provide an alternation, so that the steps are located sometimes on one side of the channel 16, sometimes on the other side, as shown in FIG. 9 where the channel 16 comprises five portions 19A, 19B, 20A, 20B and 21. The steps 22A and 23A are located on one side of the channel 16 and alternate with the steps 22B and 23B located on the other side of the channel 16.

Figure 10:
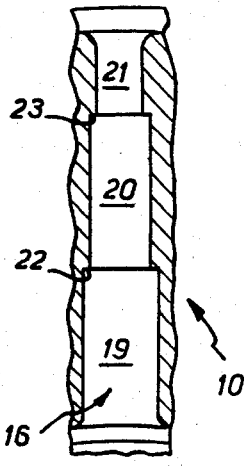
Figure 11:
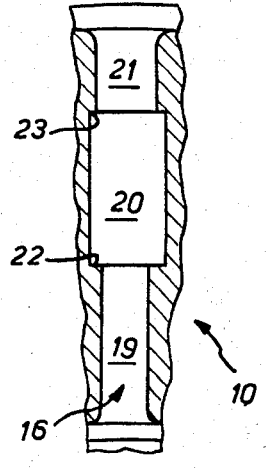

In the various embodiments described hitherto, the channel 16 diverges towards the periphery of the disc, but it can also be made either convergent (FIG. 10) or partly divergent and partly convergent (FIG. 11).

Figure 12:
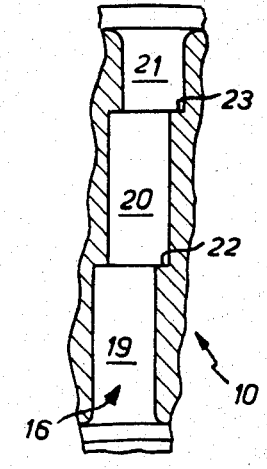

Moreover, the channel 16 can also be provided (FIG. 12) with a cross-section of constant area and, in this case, the contours of the portions 19, 20 and 21 are offset, for example because their axes are offset and/or because these contours are different.

The invention is, of course, not limited to the embodiments described and illustrated, but encompasses all alternative forms within the scope of the claims. In particular, any portion of the channel 16 in any one of the examples of FIGS. 1 to 5, or FIG. 6, FIG. 7, FIG. 8, FIG. 9, FIG. 10, FIG. 11 or FIG. 12 can have a circular, elliptical or polygonal cross-section. Likewise, any step of the channel 16 can be perpendicular to the axis or inclined relative to this axis in any one of the exemplary embodiments. Furthermore, the channel 16 can be divergent, convergent or partly divergent and partly convergent or of a cross-section of constant area in any one of the exemplary embodiments.

We claim:

1. A rotatable brake member comprising a disc having a plurality of substantially radial ventilation channels, at least one of which is divided longitudinally into at least two portions which are generally coaxial with a mean longitudinal line of the channel which is a radius of said disc, said portions having substantially constant cross-sections, said portions having an abrupt discontinuity of cross-section relative to one another, the or each channel defining a single, empty radial passage, the side wall of the or each of said portions being smooth and continuous and parallel to and symmetrical about said axis, said abrupt discontinuity of cross-section between the portions being provided by a peripheral transverse annular step, said at least one channel having three portions separated respectively by two steps and comprising an intermediate portion of circular cross-section and two end portions of elliptical cross-section, the radially inner end portion of elliptical cross-section having a major axis of the ellipse equal to the diameter of the intermediate part of circular cross-section which is itself equal to the minor axis of the ellipse of the radially outer end portion of elliptical cross-section.

2. A rotatable brake member according to claim 1, in which the steps are substantially perpendicular to the mean longitudinal line of each of said channels.

3. A rotatable brake member according to claim 1, in which the variation in the area of the cross-section of said portions is between 10% and 30%.

4. A rotatable brake member according to claim 1, in which the variation in the area of the cross-section of said portions is about 20%.

* * * * *